United States Patent [19]

Pampouchidis et al.

[11] 4,366,274

[45] Dec. 28, 1982

[54] AUTO-CROSSLINKABLE, CATHODICALLY DEPOSITABLE BINDERS

[75] Inventors: Georg Pampouchidis; Helmut Hönig, both of Graz, Austria

[73] Assignee: Vianova Kunstharz, A.G., Werndorf, Austria

[21] Appl. No.: 216,379

[22] Filed: Dec. 15, 1980

[30] Foreign Application Priority Data

Dec. 17, 1979 [AT] Austria .................................. 7908/79

[51] Int. Cl.$^3$ ............................................. C08G 59/50
[52] U.S. Cl. ................................. 523/415; 204/181 C; 523/417; 528/69; 528/111; 528/113; 528/332; 528/407
[58] Field of Search ................ 260/29.2 EP, 29.2 TN; 528/111, 113, 332, 407, 69; 204/181 C

[56] References Cited

U.S. PATENT DOCUMENTS

| | | | |
|---|---|---|---|
| 4,134,864 | 1/1979 | Belanger | 528/113 X |
| 4,147,676 | 4/1979 | Pampouchidis | 260/23 TN |
| 4,182,833 | 1/1980 | Hicks | 528/120 |
| 4,278,580 | 7/1981 | Schmölzer et al. | 260/29.2 EP |

*Primary Examiner*—Earl A. Nielsen
*Attorney, Agent, or Firm*—A. W. Breiner

[57] ABSTRACT

Auto-crosslinkable, cathodically depositable aqueous coating compositions which are the reaction product of 2 moles of a diepoxide, 1 mole of a secondary-secondary or primary-tertiary diamine, 0–1 moles of a saturated and/or unsaturated monocarboxylic acid, and 2–1 moles of a secondary amine with optional subsequent partial or total reaction of the hydroxy groups of the reaction product with an alpha,beta-unsaturated monoisocyanate. The binders are rendered water-soluble by neutralization with inorganic and/or organic acids. The binders are capable of being neutralized with low levels of neutralizing acids to provide a component of a coating composition which will cure at low temperatures to give films having excellent surface qualities.

9 Claims, No Drawings

AUTO-CROSSLINKABLE, CATHODICALLY DEPOSITABLE BINDERS

The present invention is directed to the preparation of and paint binders which are water-dilutable upon neutralization with acids. Coating compositions containing the binders are electrically depositable at the cathode of an electrodeposition system and will crosslink through thermal polymerization without need of additional components.

U.S. Pat. No. 4,147,676 discloses auto-crosslinking binders for cathodic electrodeposition paints based on amine-modified epoxy resins. According to the '676 patent, (A) 2 moles of a diepoxy compound with an epoxy equivalent of at least 100,
(B) 1 mole of an aliphatic and/or cycloaliphatic and/or aromatic diamine, the nitrogen atoms of which are either secondary-secondary or primary-tertiary, and
(C) 2 moles of a saturated and/or unsaturated monocarboxylic acid are reacted, and optionally the hydroxy groups of the reaction product are subsequently reacted partially or totally with
(D) an alpha,beta-unsaturated monoisocyanate.

The product which is obtained is rendered water-soluble through partial or total neutralization with inorganic and/or organic acids, the quantity of the unsaturated monocarboxylic acid and of the unsaturated monoisocyanate being chosen in order that the unneutralized reaction product has a double bond number of at least 0.5, preferably from 0.8 to 2.5, calculated on the number of double bonds in the alpha,beta-position. When using the binders prepared according to U.S. Pat. No. 4,147,676, it has been found that there are disadvantageous limits with regard to basicity and water dilutability. The nitrogen groups introduced via diamines for obtaining stable emulsions require an extent of neutralization which in many cases leads to corrosion of the equipment, i.e., ducts, pumps, filters, and other installations, used in applying the compositions are subject to premature deterioration, requiring early replacement or reconditioning of the equipment.

It has now been found that through modifications in the binder composition it is possible to overcome the disadvantages of the composition of the aforesaid patent to a substantial extent and at the same time obtain an improvement in essential properties, such as improved electrochemical behavior, and enhanced surface qualities. The improvement is realized in that additional basic groups are introduced by replacing partially or totally the monocarboxylic acids used as component (C) with secondary amines.

The present invention is concerned, therefore, with auto-crosslinking cathodically depositable binders and to a process for their preparation based on amine modified epoxy compounds, through reaction of:

(A) 2 moles of a diepoxy compound with an epoxy equivalent of at least 100,
(B) 1 mole of an aliphatic and/or cycloaliphatic and/or aromatic diamine, the nitrogen atoms of which are secondary-secondary or primary-tertiary,
(C) 2-1 moles of a secondary amine, preferably of a secondary alkanol amine, and
(D) 0-1 moles of a saturated and/or unsaturated monocarboxylic acid, with optional subsequent partial or total reaction of the hydroxy groups of the reaction product with
(E) an alpha,beta-ethylenically unsaturated monoisocyanate.

The quantity of components is chosen in order that the binders have an amine value sufficient to render the binders water-dilutable upon neutralization with an inorganic acid, and preferably an amine value of from about 0.8 to 3.0. Preferably the components are chosen in order that the double bond number of the binder is at least 0.5, and preferably 0.8 to 2.5. The product is partially or totally neutralized with inorganic or organic bases to render the product water-dilutable. The binders prepared according to the present invention, even at a low degree of neutralization, exhibit very good water-dilutability, high basicity, low corrosion of the installations, high deposition equivalent, and low energy consumption. The binders can be deposited at high voltage, without surface defects, and demonstrate enhanced throwing power.

Secondary amines which are preferred for the preparation of the binders of the present invention are the dialkanol amines such as diethanol amine, dipropanol amine, dibutanol amine, and their homologues, and the monoalkanolmonoalkyl amines such as methylethanol amine, ethylethanol amine, propylethanol amine, methylpropanol amine, ethylpropanol amine, and the like. Optionally, dialkylamines such as dimethylamine, diethylamine, and homologues and isomers thereof, and cyclic amines such as ethylene imine, morpholine, and the like, can be used together with the alkanol amines. Suitable saturated and unsaturated monocarboxylic acids are those with from 2 to 18 carbon atoms such as acetic acid, n-capronic acid, isononanoic acid, palmitic acid, dehydrated castor oil fatty acid, oleic acid, stearic acid, and the like.

The polyepoxides suitable for use in the present invention are preferably glycidyl ethers of phenols, particularly those derived from 4,4'bis(hydroxyphenyl)-propane (Bisphenol A), and glycidyl ethers of phenol formaldehyde condensates of the novolak type. The diamines which are suitable for use herein are exemplified by 3-dimethylaminopropylamine, 3-diethylaminopropylamine, and N,N'-diethylpropylene diamine, and the like. The preferred unsaturated monoisocyanates which can be optionally employed in accordance with the present invention are the reaction products of a diisocyanate such as tolylenediisocyanate, hexamethylenediisocyanate, and an isocyanate reactive compound such as hydroxyethylmethacrylate, hydroxypropylacrylate, and the like. The epoxy compounds, the diamines, and the isocyanates and the isocyanate reactive compounds suitable for use in accordance with the present invention are fully described in the aforesaid U.S. Pat. No. 4,147,676. The disclosure of the aforesaid patent is incorporated herein by reference.

The process of the present invention is preferably carried out whereby the diepoxides are simultaneously reacted with the diamines and secondary amines, and the optional monocarboxylic acids at from 50° to 150° C. to an epoxy value or acid value of practically 0. Thereafter, the obtained intermediates are reacted, optionally coemploying isocyanate inert solvents and polymerization inhibitors, with the required quantity of unsaturated isocyanates as are described in U.S. Pat. No. 4,147,676 at from 20° to 80° C., preferably 40° to 70° C., until an NCO-value of 0 results.

The amine groups of the coating compositions of the invention are partially or totally neutralized with organic and/or inorganic acids, such as formic acid, acetic acid, lactic acid, phosphoric acid, and the like, and diluted with water. The degree of neutralization is dependent on the individual properties of the binder employed. The binder compositions, with judicious selection of the components, can be diluted with or dispersed in water at a pH-value of from about 5 to 8, preferably from 6 to 7.

The preparation of coating compositions from the binders of the invention and the further processing of them is carried out as described in U.S. Pat. No. 4,147,676.

The following examples illustrate the invention without limiting its scope. Parts are by weight unless otherwise stated.

Preparation of Unsaturated Monoisocyanates A To E 1 mole diisocyanate is charged to a reaction vessel and, while preventing access of moisture, with stirring, 1 mole of the isocyanate reactive compound is added dropwise within 1 hour, at from 25° to 35° C. Then the batch is slowly heated to 70° C., and stirred at 70° C. for another hour. The components are listed in Table 1.

TABLE 1

| Diisocyanate | Isocyanate Reactive Compounds |
| --- | --- |
| A tolylenediisocyanate (174 g) | hydroxyethylmethacrylate (130 g) |
| B tolylenediisocyanate (174 g) | hydroxypropylacrylate (130 g) |
| C tolylenediisocyanate (174 g) | hydroxybutylacrylate (144 g) |
| D isophoronediisocyanate (168 g) | hydroxyethylacrylate (116 g) |
| E hexamethylenediisocyanate (168 g) | hydroxyethylmethacrylate (130 g) |

These reaction batches each contain 1 equivalent of free isocyanate groups and 1 polymerizable double bond.

EXAMPLES 1–8

A reaction vessel is equipped with stirrer, addition funnel, thermometer, and reflux condensor. The diepoxide compound is charged to the reaction vessel, optionally in the presence of an isocyanate inert solvent such as ethyleneglycolmonoethylether acetate. The diamine, the secondary amine, and optionally the monocarboxylic acid are added and the batch is reacted at from 100° to 150° C., preferably from 120° to 140° C., until the epoxy groups have reacted completely and an acid value of substantially 0 is attained. Then, using a polymerization inhibitor, such as hydroquinone, the reaction product is blended with the monoisocyanate intermediate and reacted at from 50° to 80° C., preferably 70° C., preventing access of moisture, until an NCO-value of 0 results.

The quantities of the components and the reaction conditions are listed in Table 2.

In this disclosure, "double bond number" is the number of chain end or side chain positioned double bonds in each 1000 molecular weight units. The denomination "amine value" (AV) means the number of basic nitrogen atoms in 1000 molecular weight units.

TABLE 2

| Example | Diepoxide (mole) | Diamine (mole) | Sec. Amine (mole) | Monocarboxylic Acid (mole) | Monoisocyanate (mole) | DBN | AV |
| --- | --- | --- | --- | --- | --- | --- | --- |
| 1 | 2 EPH A | 1 DMAPA | 2 DIPA | — | 2 A | 1.18 | 2.36 |
| 2 | 2 EPH A | 1 DÄAPA | 2 DÄOHA | — | 2 B | 1.20 | 2.40 |
| 3 | 2 EPH A | 1 DMAPA | 1 DÄOHA 1 DÄA | — | 2 A | 1.25 | 2.49 |
| 4 | 2 EPH B | 1 DMAPA | 2 DÄOHA | — | 2.5 C | 1.16 | 1.86 |
| 5 | 2 EPH C | 1 DMAPA | 2 DÄOHA | — | 2.5 E | 0.82 | 1.31 |
| 6 | 2 EPH C | 1 DMAPA | 1.5 DÄOHA | 0.5 RFS | 2.5 E | 0.80 | 1.10 |
| 7 | 1 EPH A 1 EPH C | 1 DÄAPA | 2 DÄOHA | — | 2 D | 0.84 | 1.69 |
| 8 | 1 EPH A 1 EPH C | 1 DÄAPA | 1 DÄOHA 1 DÄA | — | 2 B | 0.88 | 1.76 |

Key To Abbreviations in Table 2:
EPH A: liquid epoxy resin, based on Bisphenol A, the epoxy equivalent being about 180
EPH B: highly viscous epoxy resin, based on Bisphenol A, the epoxy equivalent being about 260
EPH C: solid epoxy resin, based on Bisphenol A, the epoxy equivalent being about 500
DMAPA: 3-dimethylaminopropylamine
DÄAPA: 3-diethylaminopropylamine
DIPA: diisopropanolamine
DÄOHA: diethanolamine
DÄA: diethylamine
RFS: dehydrated castor oil fatty acid Evaluation Of The Binders According To Examples 1 To 8

100 g of resin solids were blended with the neutralizing acid and made up to 1000 g with deionized water. 10% solutions were deposited cathodically on steel panels. The deposition time was 60 seconds in all cases. The coated substrates were rinsed with deionized water and cured at elevated temperature. The stoved films had an average film thickness of from 13 to 17 μm. The results are listed in Table 3.

TABLE 3

| No. | Neutralization[1] | pH[2] | Deposition Volt | Deposition Cure Min./°C. | Hardness[3] | Indentation[4] | Resistance [5] | Resistance [6] |
| --- | --- | --- | --- | --- | --- | --- | --- | --- |
| 1 | 2.0 A | 6.1 | 300 | 20/180 | 180 | 7.5 | 480 | 360 |
| 2 | 1.8 A | 6.4 | 260 | 20/170 | 190 | 8.5 | 400 | 320 |
| 3 | 1.9 A | 6.6 | 280 | 20/180 | 180 | 8.0 | 460 | 340 |
| 4 | 2.4 E | 6.0 | 260 | 15/170 | 170 | 8.8 | 420 | 340 |
| 5 | 3.5 M | 6.1 | 260 | 20/180 | 200 | 7.4 | 480 | 360 |
| 6 | 1.8 A | 5.9 | 280 | 20/180 | 180 | 8.0 | 440 | 340 |

TABLE 3-continued

| | | | Deposition | | | | Tests | |
|---|---|---|---|---|---|---|---|---|
| | Neutral- | | | | | | Resistance | |
| No. | ization[1] | pH[2] | Volt | Cure Min./°C. | Hardness[3] | Indentation[4] | (5) | (6) |
| 7 | 1.8 A | 6.2 | 280 | 20/170 | 180 | 7.5 | 420 | 340 |
| 8 | 2.0 A | 6.4 | 300 | 20/170 | 180 | 8.1 | 480 | 360 |

[1]quantity of acid, g. in 100 g resin solids, E = acetic acid; M = lactic acid; A = formic acid
[2]measured on a 10% aqueous solution
[3]Konig pendulum hardness, DIN 53 157 (sec)
[4]Erichsen indentation DIN 53 156 (mm)
[5]hours of water soak, 40° C., until corrosion and blisters become visible
[6]salt spray test ASTM-B 117-64, 2 mm of corrosion at the cross incision after the listed hours In this evaluation clean untreated steel panels were coated with a pigmented paint containing 20 parts by weight of aluminum silicate pigment and 2 parts by weight of carbon black in 100 parts by weight of resin solids.

As will be apparent to one skilled in the art, various modifications can be made within the scope of the aforesaid description. Such modifications being within the ability of one skilled in the art form a part of the present invention and are embraced by the appended claims.

It is claimed:

1. Auto-crosslinking, cathodically depositable binders comprising the reaction product of:
   (A) the reaction product of:
      (a) 2 moles of a diepoxy compound having an epoxy equivalent of at least 100;
      (b) 1 mole of an aliphatic and/or cycloaliphatic and/or aromatic diamine, the nitrogen atoms of which are secondary-secondary or primary-tertiary;
      (c) 2-1 moles of a secondary amine, and
      (d) 0-1 moles of an unsaturated and/or saturated monocarboxylic acid; and
   (B) an alpha,beta-ethylenically unsaturated monoisocyanate; the quantity of components being chosen whereby the double bond number of said binder is at least 0.5 and said binder has an amine value sufficient to render said binder water-dilutable upon neutralization with an acid.

2. The binders of claim 1 wherein said double bond number is from 0.8 to 2.5 and said amine value is from 0.8 to 3.0.

3. The binders of claim 1 wherein said secondary amine is a secondary alkanol amine.

4. An aqueous composition comprising an acid neutralized, self-crosslinking, cathodically depositable binder, said binder being the reaction product of:
   (A) the reaction product of:
      (a) 2 moles of a diepoxy compound having an epoxy equivalent of at least 100;
      (b) 1 mole of an aliphatic and/or cycloaliphatic and/or aromatic diamine, the nitrogen atoms of which are secondary-secondary or primary-tertiary;
      (c) 2-1 moles of a secondary amine, and
      (d) 0-1 moles of an unsaturated and/or saturated monocarboxylic acid; and
   (B) an alpha,beta-ethylenically unsaturated monoisocyanate; the quantity of components being chosen whereby the double bond number of said binder is at least 0.5.

5. The aqueous composition of claim 4 wherein said binder has a double bond number of from 0.8 to 2.5.

6. The aqueous composition of claim 4 wherein said secondary amine is a secondary alkanol amine.

7. A process for the production of auto-crosslinking, cathodically depositable binders, said binders being the reaction product of
   (A) the reaction product of:
      (a) 2 moles of a diepoxy compound having an epoxy equivalent of at least 100 are reacted with
      (b) 1 mole of an aliphatic or cycloaliphatic and/or aromatic diamine, the nitrogen atoms of which are secondary-secondary or primary-tertiary;
      (c) 2-1 moles of a secondary amine, and
      (d) 0-1 moles of an unsaturated and/or saturated monocarboxylic acid; and
   (B) an alpha,beta-ethylenically unsaturated monoisocyanate, the quantity of components being chosen whereby the double bond number of said binders is at least 0.5, and said binders have an amine value sufficient to render said binder water-dilutable upon neutralization with an acid.

8. The process of claim 7 wherein said double bond number is from 0.8 to 2.5 and said amine value is from 0.8 to 3.0.

9. The process of claim 8 further including the step of neutralizing said binders with an inorganic or organic acid to provide an aqueous composition of said binders.

* * * * *